No. 655,465. Patented Aug. 7, 1900.
G. L. STUEBNER.
CAR TRUCK.
(Application filed Mar. 17, 1900.)
(No Model.)
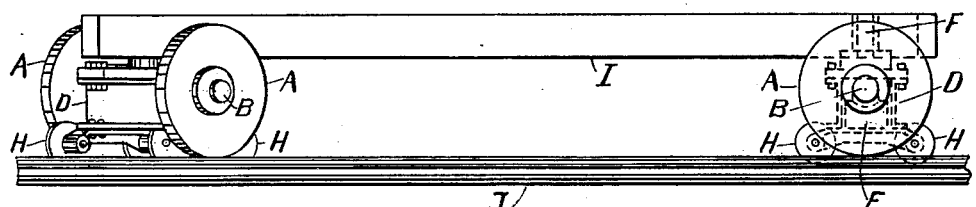
Fig 1
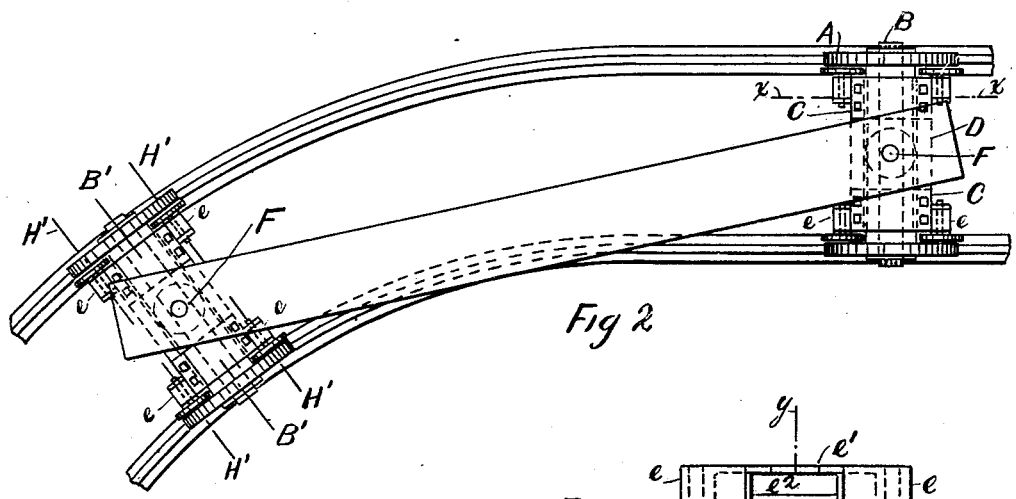
Fig 2
Fig 4
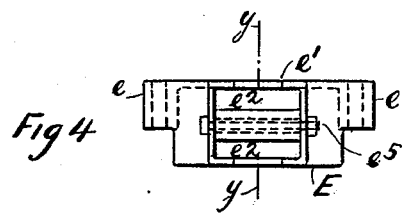
Fig 5
Fig 6
Fig 3
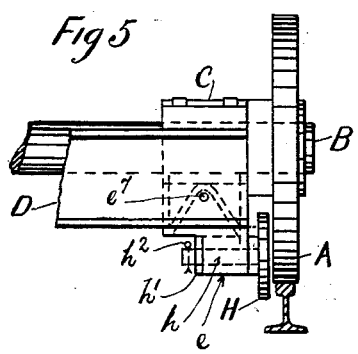
WITNESSES:
C. B. Harris
August Johnston
INVENTOR
Gustavus L. Stuebner
BY
A. A. de Bonneville
ATTORNEY

UNITED STATES PATENT OFFICE.

GUSTAVUS L. STUEBNER, OF NEW YORK, N. Y.

CAR-TRUCK.

SPECIFICATION forming part of Letters Patent No. 655,465, dated August 7, 1900.

Application filed March 17, 1900. Serial No. 9,026. (No model.)

*To all whom it may concern:*

Be it known that I, GUSTAVUS L. STUEBNER, a citizen of the United States, and a resident of the borough of Queens, New York city, in the county of Queens and State of New York, have invented certain new and useful Improvements in Car-Trucks, of which the following is a specification.

The object of my invention is an improvement in car-trucks for keeping the same on tracks when passing swiftly around short curves.

The invention consists mainly in the combination of a pair of guide-rollers with each truck-wheel, the said truck-wheels being devoid of flanges. The guide-rollers are secured on the different sides of a vertical plane passing through the truck-wheel axle. The truck-wheels and guide-rollers are carried on truck-frames which swing with a king-bolt, the said king-bolt operating with the body of the car in any suitable manner. By this combination of parts both of the guide-rollers are kept approximately tangential to the track when passing over curved or straight track.

In my United States Letters Patent No. 495,849, dated April 18, 1893, pilot-wheels are arranged with flanged truck-wheels, which combination allows the main truck-wheels to be approximately tangential to a curved track; but the pilot-wheels thereof make appreciable angles with the said curved track. In the present invention both guide-rollers are tangent to the track when straight and approximately so when on a curved track, the flanges of the main truck-wheels being dispensed with, obtaining thereby a truck which will run over curves without derailment.

Figure 1 is an elevation of a car embodying my invention, showing one truck on a straight track and the other on a curve. Fig. 2 shows a plan of Fig. 1. Fig. 3 represents a fragmentary section on the line $xx$ of Fig. 2. Fig. 4 is a top view of the combined oil-box and guide-roller journal-bearings. Fig. 5 shows a fragmentary side view of one of the truck ends. Fig. 6 is a section on the line $yy$ of Fig. 4.

An inspection of the drawings will show my truck to consist of the wheels A, devoid of flanges, secured to the truck-axles B, said axles turning in the journal-boxes C. Truck-frames D carry the journal-boxes C and the combined oil-boxes and guide-roller journal-bearings E. King-bolts F, with bearings of any suitable form, connect the body of the car with the truck-frames D. The combined oil-boxes and guide-roller journal-bearings E consist of two journal-bearings $e\ e$, connected by the vertical rib $e'$ and the oil-compartments $e^2\ e^2$. The said compartments are formed by the outside walls of the oil-box and division-walls $e^4$. On the under side of the division-walls $e^4$ the bolt $e^5$ passes to secure the oil-box and guide-roller journal-bearings to the truck-frames D in addition to the rivets $e^6$. Holes $e^7$ are in the sides of the oil-boxes, and by this disposition of parts no holes are directly drilled into the oil-compartments and the spilling of the oil is avoided.

The truck-wheel journal-boxes C are bolted to the truck-frames D by bolts $c'$.

The guide-rollers H are secured to the axles $h$, which turn in the bearings $e$, collars $h'$ and split pins $h^2$ keeping the guide-rollers in place.

On the truck-frames D are fastened any suitable bearings with king-bolts F, which are suitably connected with body of the car.

By an inspection of Figs. 1 and 2 it will be seen that the guide-rollers H project below the main truck-wheels A and below upper faces of the tracks J and can bear against the inner faces of said tracks; also, that they are on each side of a radius B' B' of the curved track drawn through the center of the king-bolt F. By this disposition the lines running through the axial centers of the guide-roller are approximately radii of the track curve, and consequently the vertical faces of the rollers are approximately tangent to the curves of the tracks at the points of contact. The distance apart of these points of contact secures good bearings to prevent the trucks running off the curved tracks, which is the main object of this device.

Having described my invention, I desire to obtain by United States Letters Patent and claim—

1. A car comprising, flangeless truck-wheels, guide-rollers on horizontal axles, in combination with an oil-box for each flangeless truck-wheel, and journal-boxes for the guide-rollers attached to said oil-boxes, located on the opposite sides of a vertical plane passing through the center of each flangeless truck-wheel.

2. In a car; truck-wheels without flanges; guide-rollers; combined guide-roller journal-bearings and oil-boxes, the guide-roller journal-bearings placed on opposite sides of a vertical plane passing through the horizontal axes of the truck-wheels; a bolt passing under the dividing-walls of the oil-compartments of the oil-boxes, substantially as described.

3. In a car-truck; truck-wheels; guide-rollers placed on the opposite sides of the centers of the truck-wheels; combined oil-boxes and guide-roller journal-bearings; truck-frames secured to the oil-boxes; king-bolts with suitable bearings connecting truck-frames with car-body; journal-bearings secured to the truck-frames for the truck-wheels, substantially as described.

Signed at New York, in the county of New York and State of New York, this 13th day of March, A. D. 1900.

GUSTAVUS L. STUEBNER.

Witnesses:
C. B. HARRIS,
WILLIAM P. FRANCL.